(12) United States Patent
Buchner et al.

(10) Patent No.: US 10,419,296 B1
(45) Date of Patent: Sep. 17, 2019

(54) APPARATUS, COMPUTER PROGRAM, AND METHOD FOR DISPLAYING A CONFIGURATION OF A COMMUNICATIONS NETWORK AS AN OVERLAY ON ANOTHER CONFIGURATION

(71) Applicant: Amdocs Development Limited, Limassol (CY)

(72) Inventors: Markus Michael Buchner, Munich (DE); Christopher Mark Bagnall, Bath (GB); James Francis Hunt, Bristol (GB); Andrew Dodds, Midsomer Norton (GB); Alan Thomas Merrill, Bath (GB); Ian Richard Blackwell, Chippenham (GB)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 264 days.

(21) Appl. No.: 15/252,114

(22) Filed: Aug. 30, 2016

(51) Int. Cl.
*H04L 12/26* (2006.01)
*H04L 12/24* (2006.01)

(52) U.S. Cl.
CPC ............ *H04L 41/145* (2013.01); *H04L 41/22* (2013.01)

(58) Field of Classification Search
CPC .............................. H04L 41/145; H04L 41/22
USPC ................................................. 370/254–258
See application file for complete search history.

(56) References Cited

U.S. PATENT DOCUMENTS

| | | | |
|---|---|---|---|
| 6,009,466 A | 12/1999 | Axberg et al. | |
| 7,171,462 B1* | 1/2007 | Kavasseri | ........... H04L 41/0803 709/220 |
| 7,660,883 B2* | 2/2010 | Fowlow | .............. H04L 41/0856 709/223 |
| 7,701,881 B1* | 4/2010 | Sankaran | ................ H04L 45/48 370/256 |
| 7,761,794 B1* | 7/2010 | Chari | ...................... G06Q 10/06 715/700 |
| 7,953,865 B1* | 5/2011 | Miller | ................. H04L 12/6418 370/254 |
| 8,341,251 B2* | 12/2012 | Gao | ..................... H04L 67/1097 709/220 |
| 8,577,926 B1 | 11/2013 | Cobleigh | |
| 2003/0071840 A1 | 4/2003 | Huang et al. | |
| 2003/0093509 A1* | 5/2003 | Li | ........................ G06F 11/0727 709/223 |
| 2003/0145041 A1* | 7/2003 | Dunham | ............... G06F 11/328 709/203 |
| 2003/0154271 A1* | 8/2003 | Baldwin | ............... G06F 3/0601 709/223 |
| 2003/0182422 A1* | 9/2003 | Bradshaw | ........... H04L 41/0893 709/225 |

(Continued)

*Primary Examiner* — Thai D Hoang
(74) *Attorney, Agent, or Firm* — Zilka-Kotab, P.C.

(57) ABSTRACT

An apparatus, computer program, and method are provided for displaying a configuration of a communications network as an overlay on another configuration. A network model is stored that represents a first configuration of a communications network. Further, one or more changes to the first configuration are identified that represent a second configuration of the communications network. The second configuration of the communications network is displayed as an overlay on the first configuration of the communications network to show the one or more changes in connection with the first configuration.

13 Claims, 6 Drawing Sheets

(56) References Cited

U.S. PATENT DOCUMENTS

| | | | |
|---|---|---|---|
| 2003/0225896 A1* | 12/2003 | Jain | H04L 29/06 709/229 |
| 2007/0091838 A1* | 4/2007 | Kobayashi | H04L 45/42 370/328 |
| 2007/0153708 A1* | 7/2007 | Dominick | H04L 41/12 370/254 |
| 2007/0214244 A1* | 9/2007 | Hitokoto | G06F 9/44505 709/220 |
| 2007/0268294 A1 | 11/2007 | Eagen et al. | |
| 2008/0151755 A1* | 6/2008 | Nishioka | H04L 41/12 370/235 |
| 2009/0055748 A1 | 2/2009 | Dieberger et al. | |
| 2009/0154374 A1* | 6/2009 | Jaatinen | H04L 41/085 370/254 |
| 2010/0211662 A1* | 8/2010 | Glendinning | H04L 41/0843 709/223 |
| 2010/0235479 A1* | 9/2010 | Toeroe | G06F 8/67 709/221 |
| 2011/0126108 A1* | 5/2011 | Beaudoin | H04M 3/2263 715/734 |
| 2011/0131302 A1* | 6/2011 | Bulusu | H04L 12/462 709/221 |
| 2012/0259965 A1* | 10/2012 | Tsuzuki | H04L 41/0213 709/223 |
| 2012/0327810 A1* | 12/2012 | Wang | H04W 36/0085 370/254 |
| 2013/0191517 A1* | 7/2013 | Ling | H04L 41/0859 709/220 |
| 2016/0112271 A1* | 4/2016 | Barth | H04J 14/0267 370/254 |

\* cited by examiner

APPARATUS, COMPUTER PROGRAM, AND METHOD FOR DISPLAYING A CONFIGURATION OF A COMMUNICATIONS NETWORK AS AN OVERLAY ON ANOTHER CONFIGURATION

FIELD OF THE INVENTION

The present invention relates to communications systems, and more particularly to planning changes to communications systems.

BACKGROUND

Prior art network management systems typically provide a network model, stored in a database, representing a current configuration of a communications network. Planners can use this model to plan changes and enhancements to the network. After such changes have been implemented in the network, the network model may then be updated to reflect the new configuration of the network.

However, planned changes may often be specified in an ad hoc, informal manner, which does not relate directly to the specific details of the network model. For example, notes may be added to a network model describing future planned modifications. However, if planned modifications are not defined sufficiently rigorous, it can be difficult for other users of the network management system to understand the exact nature of the planned changes. Also, this approach does not provide a planner with a clear picture of how planned changes will affect the network.

In some cases, a network planner may modify the network model directly to see how planned changes will affect the network, but this results in the network model no longer corresponding to the actual operational network. To address this, a planner may instead use a copy of the network model database to plan changes. However, it can then be difficult to merge changes made in the copy (of the network model database) back into the main model. If multiple planners are working on the model independently, each planner may need a separate copy of the database, exacerbating the problem of collating the planned changes. Also, the entire database may have to be locked if a planner wishes to transfer changes from a copy over into the main operational model database, affecting other users of the network management system.

There is thus a need for addressing these and/or other issues associated with the prior art.

SUMMARY

An apparatus, computer program, and method are provided for displaying a configuration of a communications network as an overlay on another configuration. A network model is stored that represents a first configuration of a communications network. Further, one or more changes to the first configuration are identified that represent a second configuration of the communications network. The second configuration of the communications network is displayed as an overlay on the first configuration of the communications network to show the one or more changes in connection with the first configuration.

DETAILED DESCRIPTION

Figure 1A:
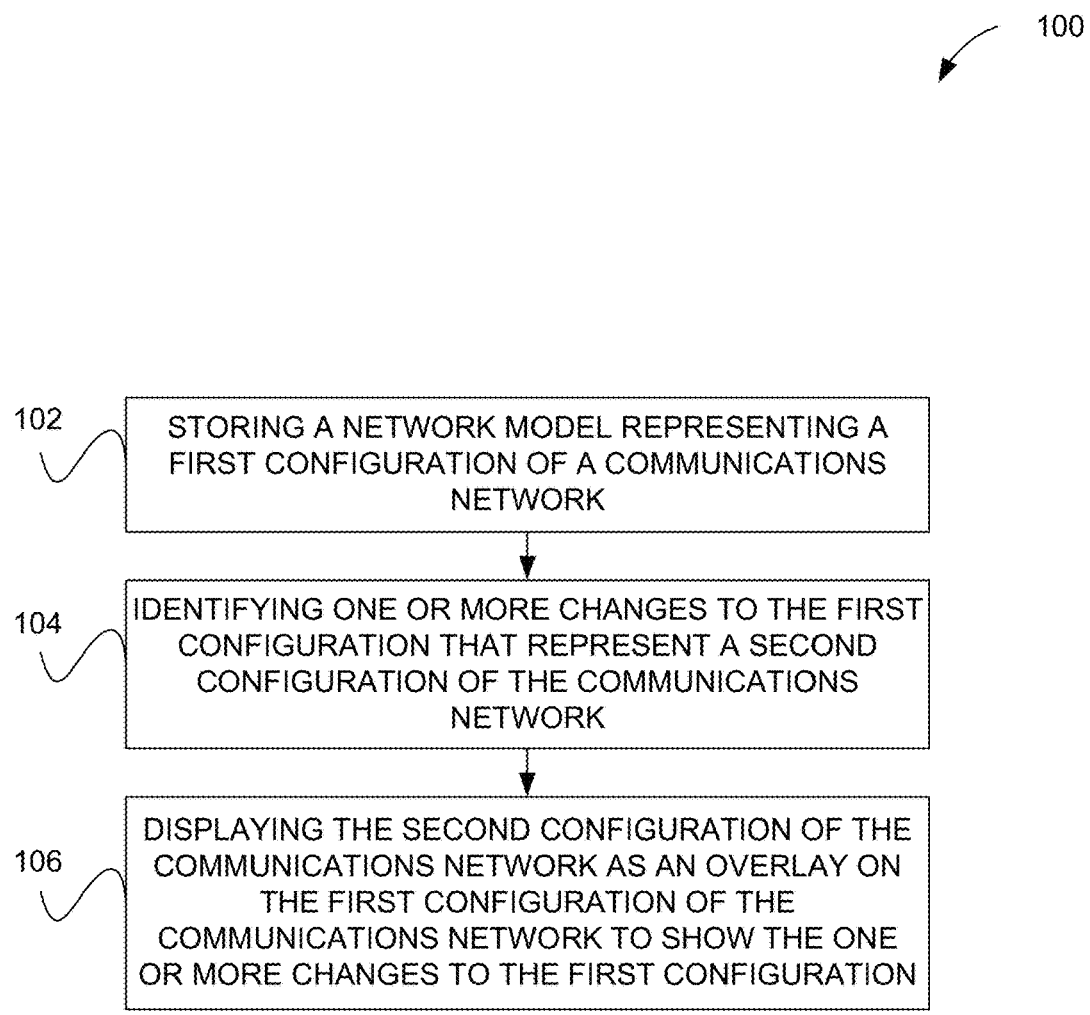
FIG. 1A illustrates a method for displaying a configuration of a communications network as an overlay on another configuration, in accordance with one embodiment.

FIG. 1A illustrates a method 100 for displaying a configuration of a communications network as an overlay on another configuration, in accordance with one embodiment. In the context of the present description, the communications network may include any network that is capable of supporting communications across the same. Non-exhaustive examples of such network may include, but are not limited to a cellular telecommunications network (e.g. WiMax, 4G/LTE/LTE-Advanced and/or any permutation thereof, etc.), a local area network (LAN), a wide area network (WAN) such as the Internet, a peer-to-peer network, a cable network, a wireless network, and/or any other type of network.

Still yet, the term configuration, in the present description, may refer to any aspect (e.g. physical, virtual, operational, etc.) of the network that is configurable (e.g. manually and/or automated) when the network is built and/or during operation. Still yet, the overlay may include any graphical user interface (or an element/portion thereof) that permits at least one first aspect of a first configuration (of the network) to be displayed in connection with at least one second aspect of a second configuration, for comparison purposes.

For instance, in various embodiments, the overlay may include an interface (or element/portion thereof) that simultaneously displays the at least one first aspect of the first configuration with the at least one second aspect of the second configuration. In still other embodiments, the overlay may include an interface (or element/portion thereof) that includes at least one first aspect of the first configuration displayed on top of or beneath the at least one second aspect of the second configuration, such that they overlap. Various examples of such an overlay will be set forth later in greater detail during reference to subsequent embodiments.

With reference to FIG. 1A, a network model representing a first configuration of a communications network is stored, per operation 102. In the context of the present description, the network model may include any data structure that describes, may be used to display, and/or otherwise represents the first configuration of a communications network. Further, the network model may be stored in any desired memory (e.g. non-volatile or volatile, local or remote, structured (database) or not, etc.). It should also be noted that any of the data items described herein may be stored in the same database (e.g. database instance, etc.) or be distributed in any desired manner.

Operation 104 thereafter serves to identify one or more changes to the first configuration that represent a second configuration of the communications network. In various embodiments, such one or more changes may be identified in connection with a receipt of manual input of the one or more changes to the first configuration, receipt via a network interface, and/or identified in any other manner that allows the display thereof, as will become apparent. For example, in one embodiment, the change(s) may be identified by receiving information defining one or more modifications to be made as part of the second configuration.

In the context of the present description, such change(s) may include any replacement, substitution, removal, and/or any other alteration of any aspect (e.g. physical, virtual, operational, etc.) of the first configuration of the communications network. In various embodiments, the change(s) may include a new object, a modified object, and/or a deleted object. Further, in one embodiment, the first configuration may include a current (e.g. as it is currently built, etc.) configuration of the communications network, while the second configuration may be a planned configuration (e.g. as it is to be adjusted, or as a current plan is to be adjusted, etc.) of the communications network.

In one embodiment, the identification in operation 104 may be carried out utilizing at least one processor (e.g. general processor, application specific processor, etc.). More information regarding various exemplary processors will be set for later during reference to subsequent embodiments. Further, it should be noted that any of the operations set forth herein may be carried out utilizing (even if just in a supporting role) the at least one processor.

To this end, the second configuration of the communications network is displayed in operation 106 as an overlay on the first configuration of the communications network. By virtue of such overlay, the one or more changes are shown in connection with the first configuration. It should be noted that the shown change(s) may take absolutely any form. For example, they may be represented as graphical user interface elements (e.g. graphic/pictorial objects, etc.), listed in a textual format, and/or any other manner that shows the same. Strictly as an option, the second configuration of the communications network may be displayed as an overlay on the first configuration of the communications network, without modifying the first configuration (e.g. either the visual representation thereof and/or the physical configuration itself, etc.).

In one embodiment, the display in operation 106 may be carried out utilizing at least one output device (e.g. display, monitor, etc.). More information regarding various exemplary output devices will be set forth later during reference to subsequent embodiments.

While not shown, in one possible embodiment, at least one modification to the first configuration of the communications network may be identified after the identification of the one or more changes to the first configuration that represent the second configuration of the communications network. In one embodiment, such at least one modification to the first configuration may refer to an actual change to at least one physical aspect of the first configuration that may or may not impact the planned one or more changes identified in operation 104. Further, the at least one modification may be identified any time after the identification of the one or more changes (e.g. even after operation 106, etc.).

By this design, a notification may be displayed in response to the identification of the at least one modification to the first configuration of the communications network. In various embodiments, such notification may refer to any message, change in a graphical user interface, and/or any other manifestation that is capable of notifying a user and/or system. As an option, the notification may be conditionally displayed in response to the identification of the at least one modification to the first configuration of the communications network, based on a determination as to whether the modification affects the one or more changes.

For example, if the identified at least one modification does not affect the one or more changes planned, no notification may be initiated. On the other hand, if the identified at least one modification does indeed affect the one or more changes planned, the notification may indeed be prompted. In various embodiments, the identified at least one modification may be determined to indeed affect the one or more changes planned, if at least one aspect of the one or more changes would be detrimentally affected in any manner (e.g. including preventing implementation, introducing complications, and/or rendering an impossible design, etc.).

In one possible embodiment, the method 100 may update the one or more changes to the first configuration, in response to the identification of the at least one modification to the first configuration of the communications network. Further, such an update may also be based on whether the modification affects the one or more changes. For example, in response to the notification (or independent thereof), the one or more changes may be automatically updated and/or a user may be allowed to manually update the same (e.g. via the presentation of various options, receipt of input regarding a change update, etc.). To this end, any aspect of the at least one modification to the first configuration of the communications network (that frustrates/would frustrate the implementation of the one or more changes of operation 104) may be circumvented, resolved, or otherwise addressed by an update to the one or more changes of operation 104.

In one embodiment, the overlay of operation 106 may also be updated, based on the foregoing at least one modification. Specifically, the at least one modification may be displayed in connection with the display of the second configuration of the communications network as an overlay on the first configuration of the communications network (similar to operation 106). In another embodiment, the at least one modification may be displayed as a shadow object. In the context of the present description, such shadow object may include any object that is rendered in a semi- or partially transparent or translucent manner.

To this end, the one or more changes in the communications network may occur after an update in response to the aforementioned at least one modification. In one embodiment, the implementation of the one or more changes in the communications network may include installing equipment, modifying installed equipment, performing manual configuration of equipment, and/or transmitting configuration information to one or more network devices to perform automatic configuration of the one or more network devices.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the exclusion of other features described.

Figure 1B:
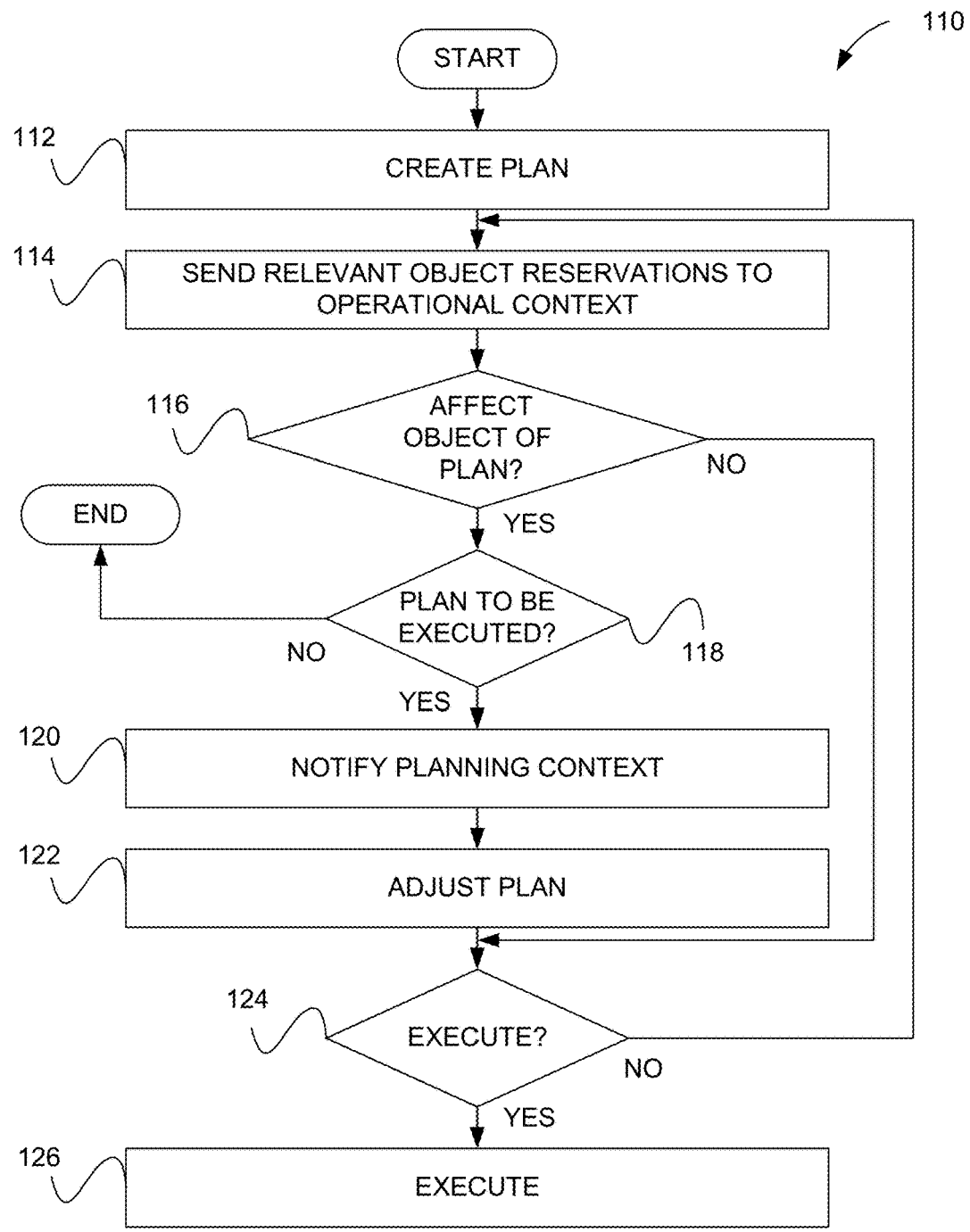
FIG. 1B illustrates a method for implementing a planned configuration for an operational configuration, in accordance with one embodiment.

FIG. 1B illustrates a method 110 for implementing a planned configuration for an operational configuration, in accordance with one embodiment. As an option, the method 110 may be implemented in the context of any one or more of the embodiments set forth in any previous and/or subsequent figure(s) and/or description thereof. However, it is to be appreciated that the method 110 may be implemented in the context of any desired environment.

As shown, the method 110 begins by creating a plan in operation 112. Such plan may involve a network model that represents a first configuration of an actual communications network that is currently in operation (e.g. an operational network configuration, etc.), identifying the fact that one or more changes to such first configuration exist that represent a second configuration of the such communications network, where such second configuration of the such communications network is a planned modification of the communications network (e.g. a planned network configuration, etc.). In one embodiment, the creation of the plan may involve any one or more of the features described in the context of operations 102, 104, and 106 of FIG. 1A. Further, operation 112 may be predicated on receiving the operational network configuration before incorporating the foregoing one or more changes.

Next, in operation 114, relevant object reservations are set to an operational context. In the present description, such operational context may refer to any aspect (e.g. personnel, componentry, management systems, etc.) of the actual communications network that is currently in operation (e.g. an operational network configuration, etc.). Further, the object reservations may refer to data structure, command, and/or any other information regarding any aspect (e.g. physical, virtual, operational, etc.) of the one or more changes that are to be made in accordance with the planned modification of the communications network (e.g. a planned network configuration, etc.).

It may then be determined whether changes to the operational context affects any object of the planned network configuration. See decision 116. In various embodiments, such decision may be carried out by determining whether one or more changes (as represented by the objects sent in operation 114) would be impacted by any modification in the operational network configuration. For example, if any modification occurs after operation 112, it may be determined (in response to an identification of such modification(s)) whether such modification would adversely impact (e.g. render impossible) an ability to implement the foregoing one or more changes in connection with the planned network configuration.

If so, a planning context may be notified in operation 120, so that the plan created in operation 112 may be updated/adjusted. See operation 122. In the present description, such planning context may refer to any aspect (e.g. personnel, componentry, management systems, etc.) of the planned communications network that is being planned (e.g. planned network configuration, etc.). As mentioned earlier, such plan adjustment may take any form including, but not limited to, displaying options for a user to select to overcome any problem, allow manual entry of adjustments, and/or enable automated plan adjustment.

As shown, if at any time the plan is no longer slated for implementation, the method 110 may be terminated. See decision 118. As an option, the plan may be stored for later use/re-use, in the event of termination in decision 118. To this end, the plan may be implemented in decision/operation 124/126, under the control of an administrator and/or in some other automated manner.

Figure 1C:
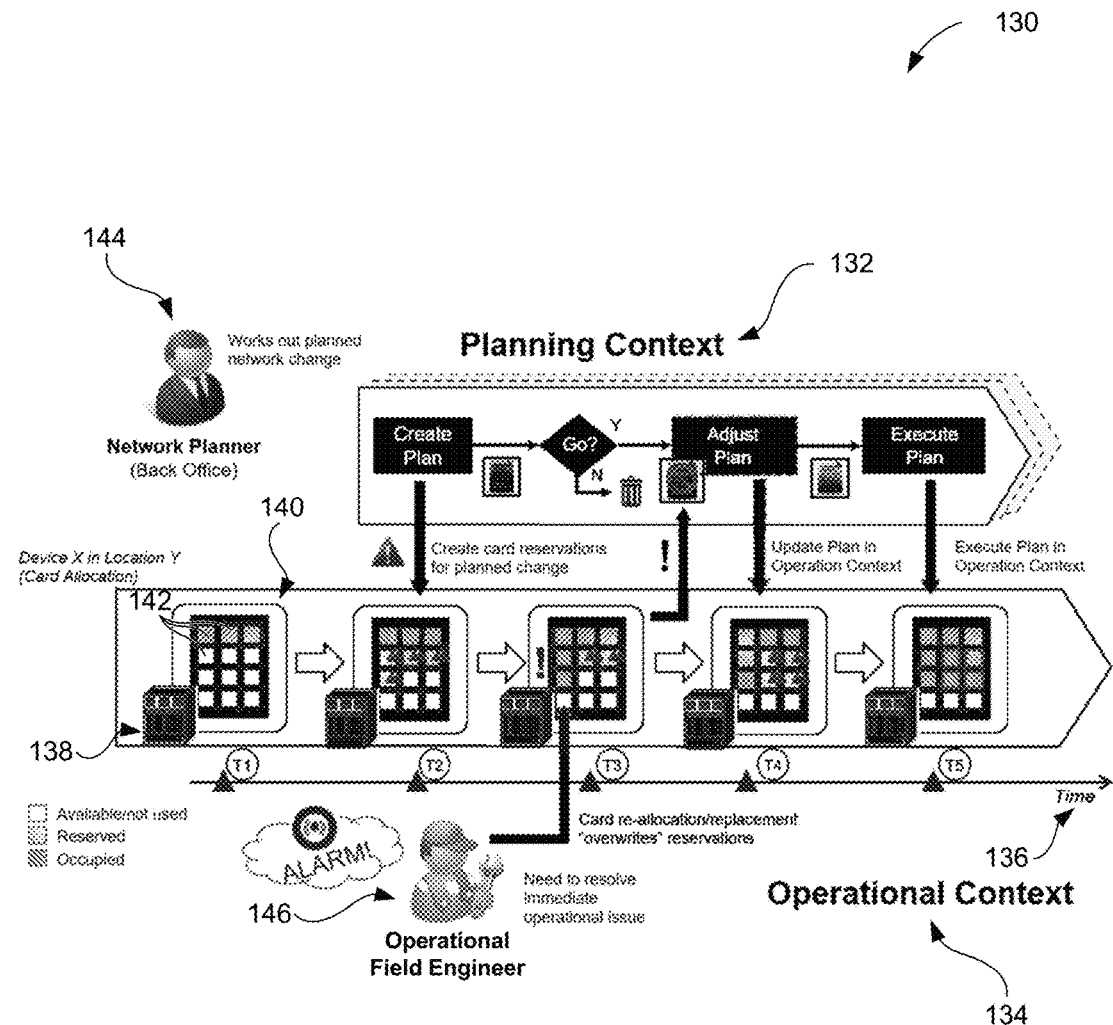
FIG. 1C illustrates an exemplary system for implementing a planned configuration for an operational configuration, in accordance with one embodiment.

FIG. 1C illustrates an exemplary system 130 for implementing a planned configuration for an operational configuration, in accordance with one embodiment. As an option, the system 130 may be implemented in the context of any one or more of the embodiments set forth in any previous and/or subsequent figure(s) and/or description thereof. For example, the exemplary system 130 may be designed for carrying out the method 110 of FIG. 1B. However, it is to be appreciated that the system 130 may be implemented in the context of any desired environment.

As shown, the system 130 includes a planning context 132 and an operational context 134. As mentioned earlier, the planning context 132 may refer to any aspect (e.g. personnel, componentry, management systems, etc.) of a planned communications network that is being planned (e.g. planned network configuration, etc.). Further, the operational context 134 may refer to any aspect (e.g. personnel, componentry, management systems, etc.) of an actual communications network that is currently in operation (e.g. an operational network configuration, etc.).

An example of an implementation of a planning technique (e.g. method 110 of FIG. 1B, etc.) will now be set forth. As shown, such planning technique may occur over time 136. Further, such planning technique may involve an actual communications network involving one or more router devices 138 that, in turn, include ports 140 (e.g. router ports, etc.) with a plurality of cards 142. As further shown via different cross-hatching, such cards 142 may include different states [e.g. available (not used), reserved, occupied, etc.].

In the context of the present example, at time T1, a first set of the cards 142 may be available and a second set of the cards 142 may be occupied, as shown. In the network operational view, a device contains a card that has a free port. At time T2, card reservations are made by the planning context 132 for reserving some of the first set of the cards 142 that are available, such that a status thereof is changed to a reserved status. In one embodiment, this may be accomplished by a network planner 144 of the planning context 132 attaching a link (e.g. database association, etc.) to one or more of the first set of the cards 142 that are available. After such link is made, additional deliberations (and possible additional changes, etc.) may be carried out on the part of the planning context 132.

Meanwhile, at time T3, a field engineer may remove one or more of the reserved cards 142 from an associated slot 140. Such removal may be performed as part of an ad-hoc change, e.g. in response to an alarm to resolve an immediate operational issue. As a result, such change may overwrite or otherwise impact the reservation of such relevant reserved cards 142. Further, a notification may be provided to the planning context 132.

Further, to the extent that an overlay (e.g. see operation 106 of FIG. 1A, etc.) is viewed by the planning context 132 (see time T4, time T5, etc.), the changed card(s) 142 may be viewed as a shadow object. An example of such a shadow object will be set forth later during the description of a subsequent embodiment. To this end, an owner of the affected planned network configuration can see that their plan has been affected by the change in the operational network configuration. Further, the card that has caused the problem is still visible and flagged as the cause (via the shadow object). Further, to the extent that other owners of other planned network configurations have planned changes that do not involve the changed card(s) 142, such owners of other planned network configurations may continue to see their changes overlaid on top of the current operational inventory view (i.e. they cannot see the deleted card, since their plans remain unaffected, etc.).

With that said, the field engineer (and other users of an operational inventory viewer interface of the operational network configuration) may not necessarily see that the relevant card(s) 142 were removed from the device 138 in a planning context. Specifically, the rest of the operational inventory view may be displayed normally (as if such planned change did not occur).

To this end, the deleted card(s) is still represented in a database table, but is flagged as deleted. Further, the user interface view that overlies the database table hides or reveals such card, depending on the current user's viewpoint (e.g. operational inventory, broken planned change, active planned change, etc.). Further, the deleted card may be associated with the planned network configurations that it broke. In one embodiment, the deleted card may be completely deleted (from the database table) when all references/flags to it (in any and all planned network configurations) have been removed.

Figure 1D:
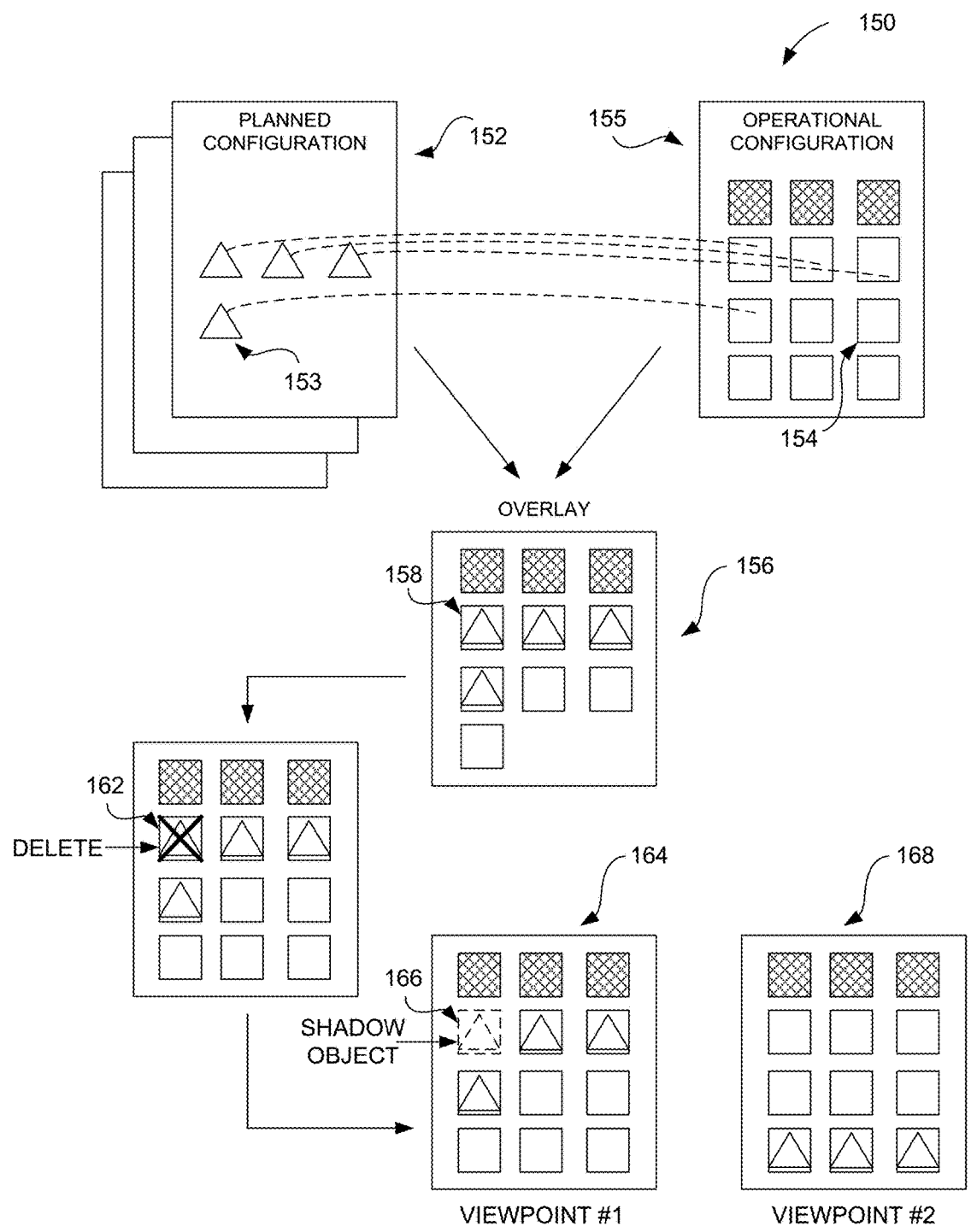
FIG. 1D illustrates an exemplary overlay for implementing a planned configuration for an operational configuration, in accordance with one embodiment.

FIG. 1D illustrates an exemplary overlay 150 for implementing a planned configuration for an operational configuration, in accordance with one embodiment. As an option, the exemplary overlay 150 may be used in the context of any one or more of the embodiments set forth in any previous and/or subsequent figure(s) and/or description thereof. For example, the exemplary overlay 150 may be used in context of operation 106 of FIG. 1A. However, it is to be appreciated that the exemplary overlay 150 may be implemented in the context of any desired environment.

As shown, a plurality of planned configurations 152 are provided which may be created (e.g. operation 112 of FIG. 1B) by a planning context (e.g. planning context 132 of FIG. 1C, etc.). Each planned configuration 152 may include a plurality of aspects 153 (e.g. physical, virtual, operational, etc.) that represents changes to aspects 154 operational configuration 155 maintained by an operational context (e.g. operational context 134 of FIG. 1C, etc.). As mentioned earlier, in one possible embodiment, the aspects 153, 154 may refer specific network components (but could include other virtual and/or operational aspects/features, in other embodiments, etc.).

In one embodiment, the illustrated contents of the planned configurations 152 and the operational configuration 155 may or may not be stored in the same single database instance and further include a plurality of links (e.g. references, etc.) between the relevant aspects 153, 154, for tracking which aspects 153 of the planned configurations 152 are relevant to various aspects 154 of the operational configuration 155. Further, the contents of the planned configurations 152 and the operational configuration 155 may be viewed independently via the planning and/or operational contexts using any desired independent and/or combined views.

For example, in one embodiment, the aspects 153, 154 may be overlaid (one on top of the other, or vice-versa) to form an overlay 156, as shown. Specifically, such overlay 156 may show both aspects 153, 154 of both planned and operational configuration 152, 155 in an overlaid fashion (e.g. see graphical user interface element 158, etc.).

To the extent that any of the aspects (e.g. components, etc.) of the operational configuration 155 are deleted like, for example, the particular aspect 162, another updated graphical user interface 164 may be available for display. As illustrated, the updated graphical user interface 164 may include a shadow object 166 that not only visually reflects the deletion of the particular aspect 162, but also maintains all relevant aspects 153, 154, for maintaining an ability to track which aspects 153 of the planned configurations 152 are relevant to various aspects 154 of the operational configuration 155. With that said, it should be noted that others of the planning configurations 152 (that are not impacted by the particular aspect 162) may be viewed without such shadow object 166. See, for example, the graphical user interface 168.

In various optional embodiments, low storage requirements and/or faster initiation and ongoing capture of planned configurations may be afforded. This may optionally be accomplished by minimizing network object versioning (as opposed to pre-emptively copying significant fragments of a network). Still yet, precise and transparent views may be afforded onto any planned configurations overlaid on top of an operation inventory view. This may, in one embodiment, be accomplished through cross-planned change/operational inventory references. Still yet, a distinguished view on an edge case of the planned change lifecycle may be afforded through shadow objects. Thus, planned change(s) may be flagged as affected by a change in the operational inventory view (immediately). Further, the planned change owner may be allowed to see which object has caused the problem and where it affects the planned change. Even still, the shadow object may be hidden from network operators and unaffected planners.

In one embodiment, any one or more of the embodiments disclosed herein may employ any one or more features of U.S. Patent. Publication Number US2010/0211662A1 filed Mar. 26, 2009, which is incorporated by reference in its entirety for all purposes. In such embodiment, instead of the partial model disclosed in the foregoing reference, an overlay of changes (e.g. delta, etc.) may be instead employed. Further, this may, in a possible embodiment, be implemented via view functionality instead of virtual private database functionality.

Figure 2:
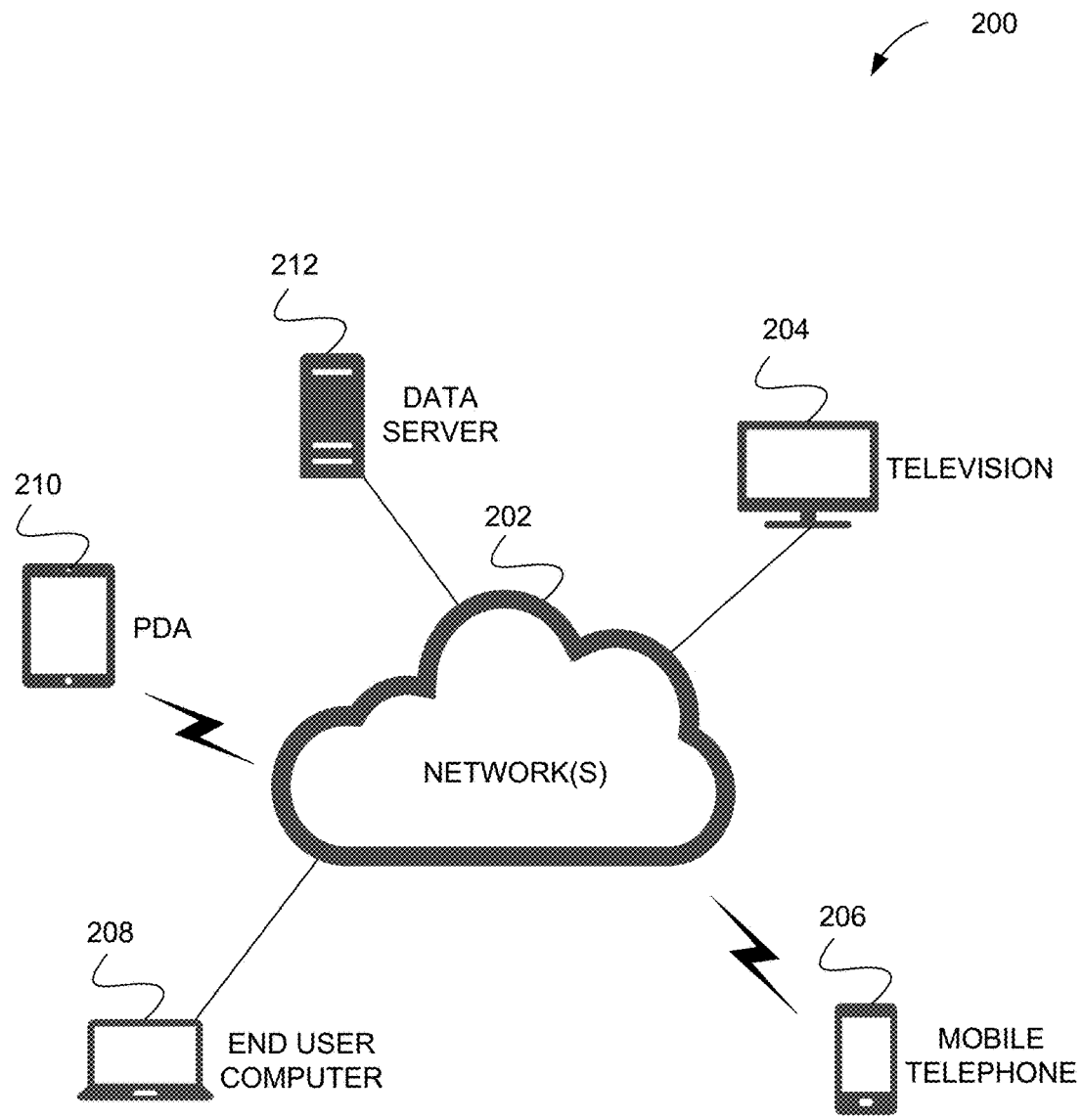
FIG. 2 illustrates a network architecture, in accordance with one embodiment.

FIG. 2 illustrates a network architecture 200, in accordance with one embodiment. As shown, at least one network 202 is provided. In the context of the present network architecture 200, the network 202 may take any form including, but not limited to a telecommunications network, cellular network (e.g. 4G/LTE/LTE-Advanced and/or any permutation thereof, etc. a local area network (LAN), a wireless network, a wide area network (WAN) such as the Internet, peer-to-peer network, cable network, etc. While only one network is shown, it should be understood that two or more similar or different networks 202 may be provided. In various embodiments, the at least one network 202 may represent one of the networks that are subject of one or more of the features of any of the embodiments described during reference to earlier figures.

Coupled to the network 202 is a plurality of devices. For example, a server computer 212 and an end user computer 208 may be coupled to the network 202 for communication purposes. Such end user computer 208 may include a desktop computer, lap-top computer, and/or any other type of logic. Still yet, various other devices may be coupled to the network 202 including a personal digital assistant (PDA) device 210, a mobile phone device 206, a television 204, etc.

Figure 3:
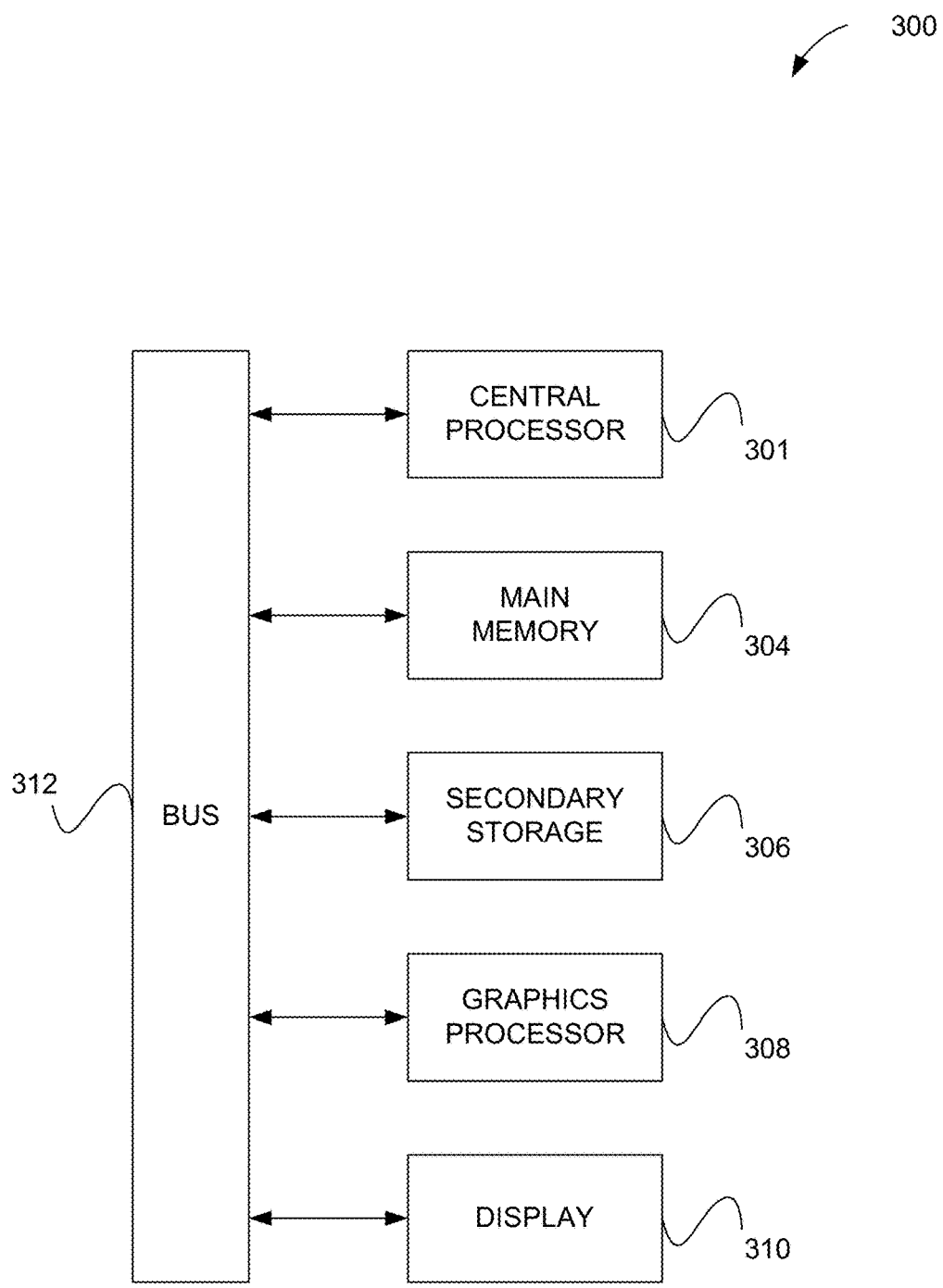
FIG. 3 illustrates an exemplary system, in accordance with one embodiment.

FIG. 3 illustrates an exemplary system 300, in accordance with one embodiment. As an option, the system 300 may be implemented in the context of any of the devices of the network architecture 200 of FIG. 2. However, it is to be appreciated that the system 300 may be implemented in any desired environment.

As shown, a system 300 is provided including at least one central processor 302 which is connected to a bus 312. The system 300 also includes main memory 304 [e.g., hard disk drive, solid state drive, random access memory (RAM), etc.]. The system 300 also includes a graphics processor 308 and a display 310.

The system 300 may also include a secondary storage 306. The secondary storage 306 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 304, the secondary storage 306, and/or any other memory, for that matter. Such computer programs, when executed, enable the system 300 to perform various functions (as set forth above, for example). Memory 304, secondary storage 306 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
storing, utilizing memory, a network model representing a first configuration of a communications network;
identifying, utilizing at least one processor in communication with the memory, one or more changes to the first configuration that represent a second configuration of the communications network; and
displaying, utilizing at least one output device in communication with the at least one processor, the second configuration of the communications network as an overlay on the first configuration of the communications network to show the one or more changes in connection with the first configuration.

2. The method according to claim 1, wherein the first configuration is a current configuration of the communications network.

3. The method according to claim 1, wherein the second configuration is a planned configuration of the communications network.

4. The method according to claim 1, wherein the network model and the changes are stored in a same database instance.

5. The method according to claim 1, wherein the one or more changes are identified by: receiving information defining one or more modifications to be made as part of the second configuration.

6. The method according to claim 1, wherein the one or more changes include at least one of a new object, a modified object, or a deleted object.

7. The method of claim 1, wherein the second configuration of the communications network is displayed as the overlay on the first configuration of the communications network, without modifying the first configuration of the communications network.

8. The method according to claim 1, and further comprising implementing the one or more changes in the communications network.

9. The method according to claim 8, wherein the implementation of the one or more changes in the communications network include at least one of: installing equipment, modifying installed equipment, performing manual configuration of equipment, and transmitting configuration information to one or more network devices to perform automatic configuration of the one or more network devices.

10. The method according to claim 1, wherein the first configuration is an actual configuration of the communications network and the second configuration is a planned configuration of the communications network, and wherein after identifying the one or more changes to the first configuration that represent the second configuration of the communications network, the method further comprises:
identifying a modification to the first configuration, the modification being an actual change to at least one physical aspect of the first configuration;
determining that the modification prevents implementation of at least a portion of the one or more changes;
responsive to determining that the modification prevents implementation of at least a portion of the one or more changes, displaying, in connection with the overlay, a notification that the modification prevents implementation of at least a portion of the one or more changes for enabling the modification to be addressed by updating the one or more changes.

11. The method according to claim 10, wherein the one or more changes are updated automatically, and wherein after updating the one or more changes, the updated one or more changes are implemented in the communications network.

12. An apparatus, comprising:
at least one processor configured for:
storing a network model representing a first configuration of a communications network;
identifying one or more changes to the first configuration that represent a second configuration of the communications network; and
displaying the second configuration of the communications network as an overlay on the first configuration of the communications network to show the one or more changes in connection with the first configuration.

13. A computer program product comprising computer executable instructions stored on a non-transitory computer readable medium that when executed by a processor instruct the processor to:
store a network model representing a first configuration of a communications network;
identify one or more changes to the first configuration that represent a second configuration of the communications network; and
display the second configuration of the communications network as an overlay on the first configuration of the communications network to show the one or more changes in connection with the first configuration.

* * * * *